3,162,666
O-ARYL S-ARYL PHOSPHORAMIDODITHIOATES
Kenneth C. Kauer, Midland, Mich., assignor to The Dow
 Chemical Company, Midland, Mich., a corporation of
 Delaware
No Drawing. Filed July 9, 1962, Ser. No. 208,624
7 Claims. (Cl. 260—461)

The present invention is directed to the O-aryl S-aryl phosphoramidodithioates corresponding to the formula

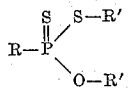

In this and succeeding formulae, R represents amino or loweralkylamino, and each R' represents phenyl or substituted phenyl wherein the substituents are selected from the group consisting of bromo, chloro, loweralkoxy, loweralkyl, and loweralkylthio. In the present specification and claims, the expressions loweralkoxy and lower alkyl are employed to refer respectively to the alkoxy and alkyl radicals containing from 1 to 5 carbon atoms, inclusive. These compounds are liquid or crystalline solid materials which are somewhat soluble in many common organic solvents and of very low solubility in water. The compounds are useful as parasiticides and are adapted to be employed as active toxicants in compositions for the control of mite, helminth, insect, bacterial and fungal organisms such as aphids, beetles, ticks, worms, and ascarids. The compounds are also useful as herbicides for the control of a number of undesirable grass and weed species.

The novel compounds of the present invention are prepared by several operational procedures. Thus the compounds are produced by reacting phosphorus thiochloride successively with (1) ammonia or a loweralkylamine, (2) phenol or a substituted phenol wherein the substituents are selected from the group consisting of bromo, chloro, lower alkoxy, loweralkyl, and loweralkylthio (3) benzenethiol or a substituted benzenethiol wherein the substituents are selected from the group consisting of bromo, chloro, loweralkoxy, loweralkyl, and loweralkylthio. Representative substituted phenol compounds include p-(methylthio)-phenol, 3,4,5 - trimethylphenol, p - butoxyphenol, p-pentylphenol, 4-bromo-2-isopropylphenol, p-methylphenol, o-bromophenol, and 2,5-dichloro-4-ethoxyphenol. Representative substituted benzenethiol compounds include p-(ethylthio)benzenethiol, 2 - bromo - 4 - methoxybenzenethiol, p-chlorobenzenethiol, 2,6-dimethylbenzenethiol, p-ethoxybenzenethiol, 3,4-dimethoxybenzenethiol, and p-tert-butylbenzenethiol. In such procedures, the amidation is first effected, if desired, and the amidated product thereafter successively esterified with the phenol and the benzenethiol. Such esterification can be first carried out with either the phenol or benzenethiol and the second esterification with the remaining esterifying reactant. In an alternative procedure, the phosphorus thiochloride is esterified in either order with the phenol and the benzenethiol and the resulting product thereafter amidated. In a further procedure, the phosphorus thiochloride is first esterified with either the phenol or the benzenethiol, following which the resulting intermediate is first amidated and thereafter esterified with the remaining esterifying reactant. The esterification and amidation are carried out in the presence of an acid binding agent or hydrogen chloride acceptor such as a tertiary amine or an alkali metal hydroxide. Representative agents include pyridine and sodium hydroxide. Conveniently, the amidation is carried out in twice the proportion of the amidating reagent, such excess of reagent being employed as the acid binding agent. In an alternative procedure, the esterification is carried out by employing the alkali metal salt of the phenol or benzenethiol such as the sodium or potassium salt.

The esterification and amidation reactions are carried out in a liquid reaction medium such as diethyl ether, methylene chloride, acetone, dimethylformamide, benzene, chlorobenzene and toluene. The reactions are somewhat exothermic and take place readily at temperatures at which chloride is produced as a product of reaction. This chloride is evolved as gaseous hydrogen chloride, or appears in the reaction mixture as the chloride of the acid binding agent or of the metal in any employed alkali metal alcoholate. Following any esterification or amidation reactions, the reaction mixture conveniently is cooled and any chloride removed by filtration. The temperature of reaction may be controlled by regulating the rate of adding the esterifying or amidating reagents to the reaction zone and by external cooling. Good results are obtained when operating at temperatures of from —10° to 80° C. and employing one molecular proportion of phosphorus thiochloride with one molecular proportion of each of the esterifying reagents and of the amidating reagents. In the esterification and amidation reactions, the acid binding reagent is employed in an amount substantially equimolecular with the amount of the esterifying or amidating reagents. Upon completion of the reaction, the reaction mixture is treated by conventional procedures to separate the desired product. In one such procedure, the mixture is filtered, successively washed with water and dilute alkali metal hydroxide or alkali metal salt such as sodium carbonate, and any reaction medium removed by evaporation or fractional distillation under reduced pressure to obtain the desired product as a residue. This product can be further purified by conventional methods.

In carrying out the reaction, the phosphorus thiochloride is successively reacted with the phenol and benzenethiol or their metal salts to produce an O-phenyl S-phenyl phosphorochloridodithioate intermediate. This intermediate is thereafter reacted with ammonia or loweralkylamine to produce the desired product. In an alternative procedure, the phosphorus thiochloride is amidated and thereafter reacted with a phenol compound or its metal salt to produce an O-phenyl phosphoramidochloridothioate intermediate. This intermediate is then esterified with the benzene thiol or its metal salt to produce the desired product. In a similar procedure, the order of esterification is reversed to produce an S-phenyl phosphoramidochloridodithioate intermediate which is subsequently esterified with the phenol compound or its metal salt to produce the desired product. In a further procedure, the phosphorus thiochloride is esterified with the phenol or its metal salt and the resulting product amidated to produce an O-phenyl phosphoramidochloridothioate intermediate. This intermediate is subsequently esterified with the benzenethiol or its metal salt to produce the desired product. In a similar procedure, the first esterification is carried out with the benzenethiol or its salt to produce an S-phenyl phosphoramidochloridodithioate which is subsequently esterified with the phenol or its salt.

In a preferred procedure, the compounds of the present invention are prepared by reacting together the alkali metal salt of the benzenethiol and an O-phenyl phosphoramidochloridothioate intermediate to obtain the desired product. This intermediate can be prepared by esterifying phosphorus thiochloride with a suitable phenol to obtain an O-phenyl phosphorodichloridothioate which is thereafter amidated to yield the desired intermediate. This intermediate can also be prepared by amidating the phosphorus thiochloride and thereafter esterifying with a suitable phenol to produce the desired intermediate.

The following examples merely illustrate the invention and are not to be construed as limiting.

Example 1.—*O-2,4,5-Trichlorophenyl S-p-Chlorophenyl Isopropylphosphoramidodithioate*

Two moles of isopropylamine are added portionwise and at a temperature of from 0° to 3° C. to one mole of O-2,4,5-trichlorophenyl phosphorodichloridothioate dispersed in one and one half liters of methylene chloride. The addition is carried out with stirring and over a period of one hour. The reaction mixture is then filtered, the filtrate washed with water, and the solvent removed from the washed product by distillation under reduced pressure to obtain the O-2,4,5-trichlorophenyl isopropylphosphoramidochloridothioate product as a white crystalline material melting at 46–51° C.

Sodium (2.3 grams; 0.1 mole) and p-chlorobenzenethiol (14.5 grams; 0.1 mole) are mixed together in 100 milliliters of absolute ethanol to produce the sodium salt of p-chlorobenzenethiol in the ethanol reaction medium. 35.3 grams (0.1 mole) of O-2,4,5-trichlorophenyl isopropylphosphoramidochloridothioate are added portionwise with stirring to the above mixture containing the sodium salt. The addition is carried out over a period of fifteen minutes and at a temperature of from 10° to 15° C. Stirring is thereafter continued for forty minutes and the temperature of the mixture subsequently raised to from 40° to 50° C. and maintained thereat for 15 minutes. Thereafter the mixture is further heated to a temperature of 60° C. for 5 minutes and then allowed to cool to room temperature. The reaction mixture is subsequently washed with water, the washed mixture dried and filtered, and the solvent removed from the filtrate by distillation under reduced pressure. As a result of these operations there is obtained the O-2,4,5-trichlorophenyl S-p-chlorophenyl isopropylphosphoramidodithioate product as a liquid material having a refractive index $n/D$ of 1.6100 at 25° C.

Example 2.—*O-p-Chlorophenyl S-p-Tert-Butylphenyl Isopropylphosphoramidodithioate*

Sodium (2.3 grams; 0.1 mole) is mixed with p-tert-butylbenzenethiol (16.6 grams; 0.1 mole) in 300 milliliters of toluene and the mixture heated at from 50° to 60° for two hours with stirring, to prepare a mixture containing the sodium salt of p-tert-butylbenzenethiol. O-p-chlorophenyl isopropylphosphoramidochloridothioate (28.4 grams; 0.1 mole) is added to the above heated salt mixture. The addition is carried out over a period of 30 minutes and at a temperature of from 50° to 55° C. Thereafter the reaction mixture is permitted to cool to room temperature, the cooled mixture washed with water, and the solvent removed from the washed product by fractional distillation under reduced pressure. As a result of these operations there is obtained the O-p-chlorophenyl S-p-tert-butylphenyl isopropylphosphoramidodithioate product as a liquid residue having a density of 1.1491 at 25° C. and a refractive index $n/D$ of 1.5737 at 25° C.

Example 3.—*O-4-Tert-Butyl-2-Chlorophenyl S-p-Chlorophenyl Methylphosphoramidodithioate*

Sodium (2.3 grams; 0.1 mole) is mixed with 14.5 grams (0.1 mole) of p-chlorobenzenethiol in 300 milliliters of toluene to prepare a mixture containing the sodium salt of p-chlorobenzenethiol. O-4-tert-butyl-2-chlorophenyl methylphosphoramidochloridothioate (31.2 grams; 0.1 mole) is added portionwise to the above prepared salt mixture with stirring. The addition is carried out at a temperature of from 16° to 21° C. The reaction mixture is then warmed to a temperature of 55° C. for 0.5 hour and thereafter cooled to room temperature. The reaction mixture is then washed with water, and the solvent removed from the washed product by distillation under reduced pressure. As a result of these operations, there is obtained the O-4-tert-butyl-2-chlorophenyl S-p-chlorophenyl methylphosphoramidodithioate product as a residue. This product is found to be a liquid material having a density of 1.1929 at 25° C. and a refractive index $n/D$ of 1.5733 at 25° C.

Other O-aryl S-aryl phosphoramidodithioates are similarly prepared in excellent yields and in the following manner.

O-p-chlorophenyl S-p-chlorophenyl methylphosphoramidodithioate ($n/D$ of 1.6094 at 25° C.) by reacting together the sodium salt of p-chlorobenzenethiol and O-p-chlorophenyl methylphosphoramidochloridothioate.

O-p-(ethylthio)phenyl S-p-bromophenyl N-ethyl-N-methylphosphoramidodithioate (molecular weight of 462.5) by successively reacting phosphorus thiochloride with N-ethyl-N-methylamine, the sodium salt of p-(ethylthio)phenol, and the sodium salt of p-bromobenzenethiol.

O-phenyl S-pentachlorophenyl pentylphosphoramidodithioate (molecular weight of 523.7) by reacting together the sodium salt of pentachlorobenzenethiol and O-phenyl pentylphosphoramidochloridothioate.

O-2,4-dichlorophenyl S-p-chlorophenyl methylphosphoramidodithioate ($n/D$ of 1.6050 at 25° C.) by reacting together the sodium salt of p-chlorobenzenethiol and O-2,4-dichlorophenyl methylphosphoramidochloridothioate.

O-p-methylphenyl S-p-methoxyphenyl ethylphosphoramidodithioate (molecular weight of 353.5) by reacting together the sodium salt of p-methoxybenzenethiol and O-p-methylphenyl ethylphosphoramidochloridothioate.

O-m-(pentyloxy)phenyl S-o-bromophenyl phosphoramidodithioate (molecular weight of 446.4) by reacting together the sodium salt of o-bromobenzenethiol and O-m-(pentyloxy)phenyl phosphoramidochloridothioate.

O-p-chlorophenyl S-p-chlorophenyl isopropylphosphoramidodithioate ($n/D$ of 1.6029 at 25° C.; nitrogen content of 3.52 percent) by reacting together the sodium salt of p-chlorobenzenethiol and O-p-chlorophenyl isopropylphosphoramidochloridothioate.

O-2,4-dichlorophenyl S-p-tert-butylphenyl methylphosphoramidodithioate ($n/D$ of 1.5888 at 25° C.) by reacting together the sodium salt of p-tert-butylbenzenethiol and O-2,4-dichlorophenyl methylphosphoramidochloridothioate.

O-2-chloro-4-(methylthio)phenyl S-phenyl phosphoramidodithioate (molecular weight of 361.9) by reacting together phosphoramidodichloridothioic acid, the sodium salt of 2-chloro-4-(methylthio)-phenol, and the sodium salt of benzenethiol.

O-3-bromo-4-methoxyphenyl S-4,5-dimethoxy-2-methylphenyl dimethylphosphoramidodithioate (molecular weight of 492.4) by reacting together the sodium salt of 4,5-dimethoxy-2-methylbenzenethiol and O-3-bromo-4-methoxyphenyl dimethylphosphoramidochloridothioate.

O-2,4-dichlorophenyl S-p-chlorophenyl isopropylphosphoramidodithioate ($n/D$ of 1.6050 at 25° C.) by reacting together the sodium salt of p-chlorobenzenethiol and O-2,4-dichlorophenyl isopropylphosphoramidochloridothioate.

O-3,4-diethoxyphenyl S-p-ethoxyphenyl propylphosphoramidodithioate (molecular weight of 455.6) by reacting together the sodium salt of p-ethoxybenzenethiol O-2,4-dichlorophenyl isopropylphosphoramidochloridothioate.

O-3,4,5-trimethylphenyl S-phenyl ethylphosphoramidodithioate (molecular weight of 351.3) by reacting together the potassium salt of benzenethiol and O-3,4,5-trimethylphenyl ethylphosphoramidochloridothioate.

O-p-methylphenyl S-4-tert-butyl-2-chlorophenyl, sec-butylphosphoramidodithioate (molecular weight of 442.0) by reacting together the sodium salt of 4-tert-butyl-2-chlorobenzenethiol and O-p-methylphenyl sec-butylphosphoramidochloridothioate.

The new compound of the present invention have been found to be useful as herbicides and parasiticides for the control of a number of plant mite, insect, bacterial and fungal organisms. For such use, the products can be dispersed on a finely divided solid and employed as dusts. Also, such mixtures can be dispersed in water with the aid of a wetting agent and the resulting aqueous suspensions employed as sprays. In other procedures, the products can be employed as constituents of organic liquid compositions, oil-in-water or water-in-oil emulsions or water dispersions with or without the addition of wetting, dispersing or emulsifying agents. In representative operations, aqueous compositions containing 100 parts per million by weight of O-2,4-dichlorophenyl S-p-chlorophenyl methylphosphoramidodithioate give 100 percent controls of two spotted spider mite.

The substituted benzenethiols to be employed as starting materials according to the present invention are prepared in known methods by the reaction of the corresponding substituted benzene compounds and chlorosulfonic acid to prepare the intermediate substituted benzene-chlorosulfonate. This intermediate is then treated with zinc in the presence of hydrogen to yield the desired benzenethiols. In an alternative procedure, certain of the starting materials can be conveniently prepared in known procedures wherein poly(loweralkylthio) benzenes are treated with alkali metal in liquid ammonia to cleave therefrom one of the loweralkyl groups. A summary of various such methods is found in the Journal of the American Chemical Society, volume 75, page 6019, and the references there cited. Others are identified in "Organic Chemistry of Bivalent Sulphur" (Chemical Publishing Company, New York, 1958), volume 1, page 71, the tabulation of "Properties of Some Aromatic Mercaptans" and the references (see pages 75–106) there listed.

The substituted benzenes and phenols employed in accordance with the present teachings are prepared in known procedures of halogenation, alkylation and etherification of benzene or phenol, or suitable substitution products thereof with halogen, alkyl halides or alkanols. Alkylthiobenzenes and phenols are conveniently prepared by known condensation operations wherein halobenzenes or halophenols or suitable substitution products thereof are condensed with alkyl mercaptans at somewhat elevated temperatures and in the presence of a nitrogenous base. Following the reaction, the desired product is separated by fractional distillation.

I claim:

1. The compound corresponding to the formula

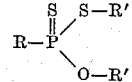

wherein R represents a member of the group consisting of amino and loweralkylamino, and each R' represents a member of the group consisting of phenyl and substituted phenyl in which the substituents are selected from the group consisting of bromo, chloro, loweralkoxy, loweralkyl and loweralkylthio.

2. O-2,4,5-trichlorophenyl S-p-chlorophenyl isopropylphosphoramidodithioate.

3. O-p-chlorophenyl S-p-tert-butylphenyl isopropylphosphoramidodithioate.

4. O-p-chlorophenyl S-p-chlorophenyl methylphosphoramidodithioate.

5. O-2,4-dichlorophenyl S-p-chlorophenyl methylphosphoramidodithioate.

6. O-p-chlorophenyl S-p-chlorophenyl isopropylphosphoramidodithioate.

7. O-2,4-dichlorophenyl S-p-chlorophenyl isopropylphosphoramidodithioate.

References Cited in the file of this patent

UNITED STATES PATENTS

| | | |
|---|---|---|
| 2,615,037 | Moyle | Oct. 21, 1952 |
| 2,894,019 | Maeder | July 7, 1959 |
| 2,967,884 | Dunn et al. | Jan. 10, 1961 |
| 2,994,638 | Malz et al. | Aug. 1, 1961 |